UNITED STATES PATENT OFFICE.

JAMES SPRATT, OF HORSTED KEYNES, ASSIGNOR TO EDWARD WYLAM, CHARLES JOHN WYLAM, AND GEORGE BEETHAM BATCHELOR, OF SURRY COUNTY, ENGLAND.

IMPROVEMENT IN FOOD FOR CATTLE.

Specification forming part of Letters Patent No. 180,953, dated August 8, 1876; application filed May 16, 1876.

*To all whom it may concern:*

Be it known that I, JAMES SPRATT, of Horsted Keynes, in the county of Sussex and Kingdom of England, have invented Improved Preparation of Food for Horses, Cattle, Game, Poultry, and other domestic animals, such preparation being capable of admixture with compounds for the production of a medicated food for man, of which the following is a specification:

The object of my invention is the production of a rich and wholesome food for both man and animals; and this object I attain by mixing or introducing into other substances for producing food the fruit of the date-tree, (*Phœnix dactilifera,*) as described in English patent granted to me A. D. 1868, No. 3,250.

This date-fruit may be mixed with flour or other farinaceous substances, grain or seed of any kind, especially malt; and, if desired, the food may be varied by the addition of chocolate or cocoa-berries, meat or its residuum after boiling down, oil-cake, sulphur, or spices, and any saccharine substance to sweeten the compound. One or more of the substances with which the date-fruit is mixed may, however, be omitted without departing from my invention.

A plain, wholesome food for man may be made from a mixture, in suitable proportions, of the date-fruit, flour, and sufficient sugar to sweeten the compound, the berries, meat, spices, &c., being omitted, though one or more of these latter may also be introduced.

A compound of the following ingredients I have found very efficacious as a food for dogs, poultry, and other domestic animals: Ten parts of the fruit of the date-tree, seventy parts of flour or any farinaceous meal, one part of malt, one part of cocoa-berries, one part of oil-cake, twenty parts of meat or its residuum, with about a handful each of sulphur or iron, suitably prepared, and spices mixed with sufficient sugar to render the compound palatable.

When the food is to be used for herbivorous animals—as horses, cattle, &c.—the meat is omitted, and an additional quantity of dates and flour added.

In making the food the ingredients are well mixed together, and sufficient water, milk, wine, or other liquid, as circumstances require, is added to bring them to a pasty consistency, when they may be made into cakes and baked. It may be found useful to afterward pulverize these cakes for convenience in feeding animals.

I have found that this mixture of the fruit of the date-tree with farinaceous and other substances used in producing food makes a very wholesome food, which imparts tone and vigor to the system, and especially imparts great fecundity to game and poultry.

I claim as my invention—

As a new article of food, a cake consisting of a mixture of the fruit of the date-palm with flour or other farinaceous substances, as set forth.

In witness whereof I have signed my name to this specification in the presence of two subscribing witnesses.

JAMES SPRATT.

Witnesses:
CHAS. MILES,
    47 *Lincoln's Inn Fields, London.*
FRANCIS SIMPSON,
    16 *Essex Street, Strand, London.*